Jan. 8, 1946.     J. R. STEINHOFF     2,392,420
APPARATUS FOR RADIO DIRECTION FINDING
Filed Nov. 4, 1941     2 Sheets-Sheet 1
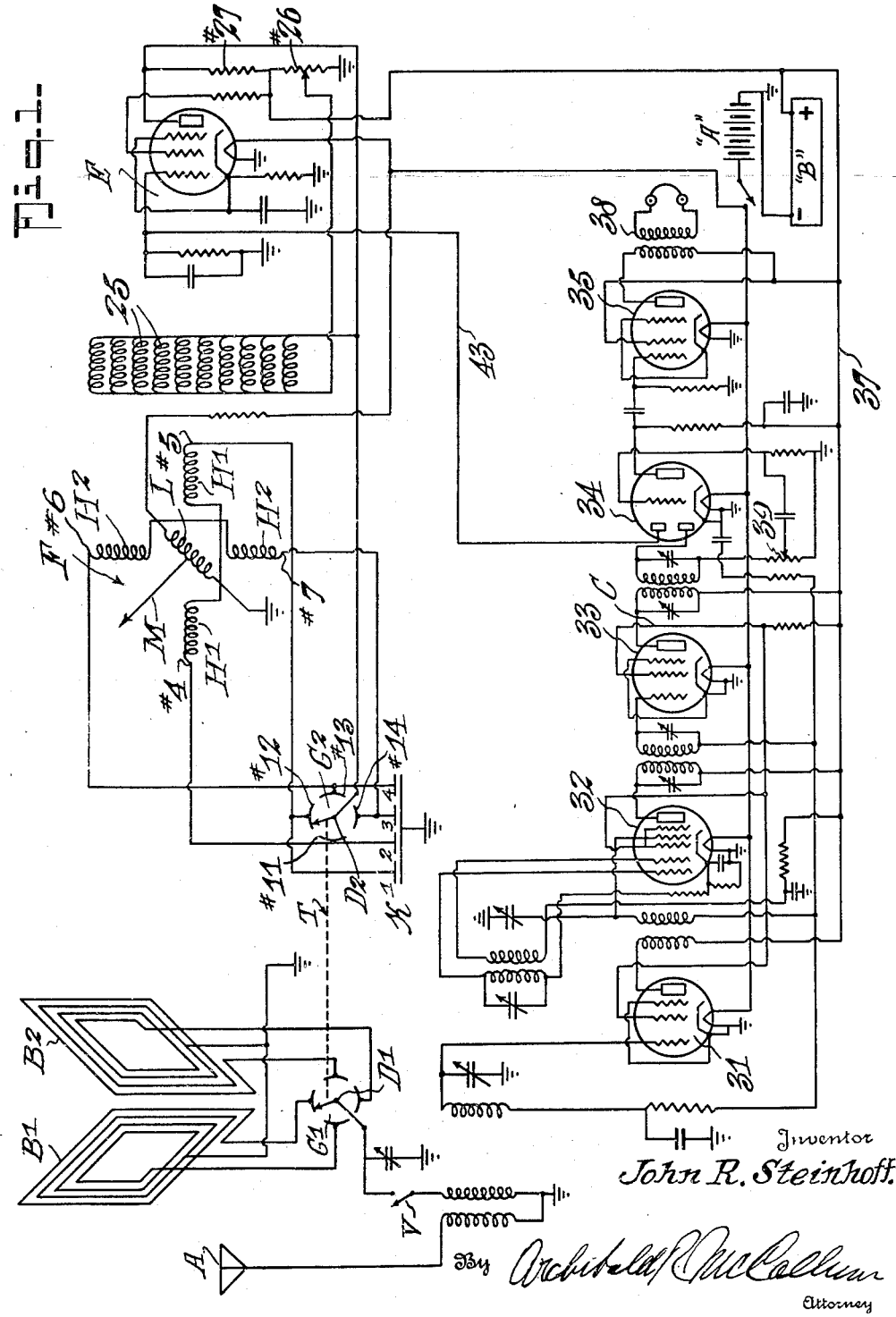
Inventor
John R. Steinhoff.
By Archibald R. McCallum
Attorney Jan. 8, 1946.  J. R. STEINHOFF  2,392,420
APPARATUS FOR RADIO DIRECTION FINDING
Filed Nov. 4, 1941  2 Sheets-Sheet 2
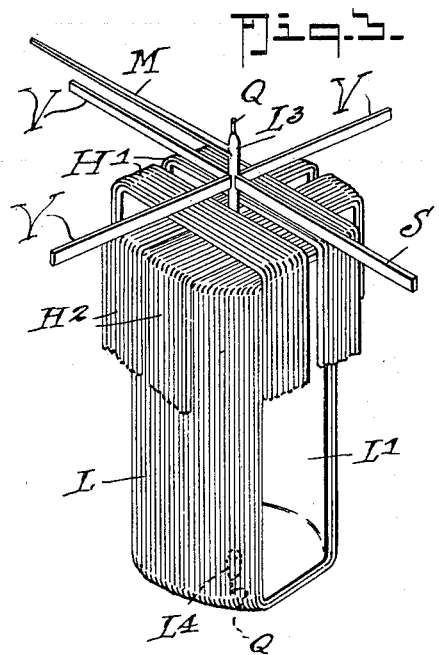
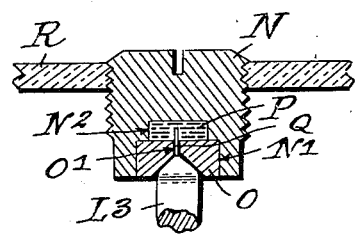
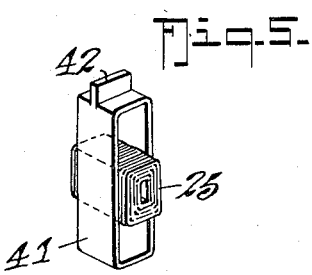
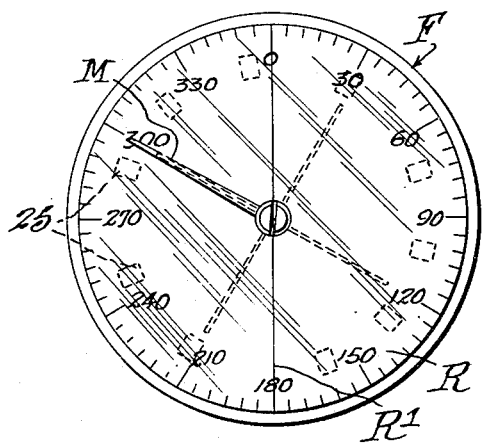
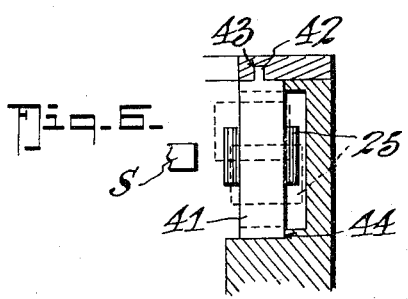
Inventor
John R. Steinhoff.

Patented Jan. 8, 1946

2,392,420

UNITED STATES PATENT OFFICE 2,392,420

APPARATUS FOR RADIO DIRECTION FINDING

John R. Steinhoff, Washington, D. C.

Application November 4, 1941, Serial No. 417,835

12 Claims. (Cl. 250—11)

This invention relates to improvements in apparatus for radio directional finding and more particularly to apparatus for indicating by radio the direction of movement of a vehicle.

An object of the invention is to provide a reliable and efficient apparatus for providing visual indication of the direction of a predetermined transmitter with respect to a moving vehicle.

Another object of the invention is to provide for radio direction finding, a dynamometer type of instrument capable of rotating through three hundred sixty degrees.

Another object of the invention is to provide an instrument design which will enable the convenient utilization in the dynamometer type, of adjustable coils for compensating errors caused by absorption or reradiation of the signal by objects in the vicinity.

Another object of the invention is to provide an improved system for determining the direction of a radio transmitter including non-rotating antennae, a radio receiver, two sets of rotary contacts and an instrument which will be responsive to four series of interspersed signals amplified and rectified separately by the receiver, including provision for four separate D. C. potentials proportional to the series of impulses.

The above and other objects of the invention will be clearly understood by referring to the following detailed description and the accompanying drawings forming a part thereof, wherein Figure 1 shows a wiring diagram embodying the system;

Figure 2 is a plan view of the dynamometer type of instrument;

Figure 3 is a perspective fragmentary view of associated stationary and moving coils forming a part of said instrument;

Figure 4 is a detailed view of one of the pairs of bearings utilized in said instrument;

Figure 5 is a detailed view in perspective showing a bracket for mounting one of the compensating coils; and Figure 6 is a detailed section on an enlarged scale of a portion of the instrument showing the coil bracket slidably disposed therein.

In the art of directional radio receivers, it has been a practice in some instances to alternate the connections of a directional loop antenna, which is inductively coupled to a vertical antenna and the input of a radio receiver, to provide two series of signal voltages proportional to the phase relation to the vertical. When the plane of the loop is in line with the transmitter and in phase with the vertical antenna, a maximum signal is applied to the receiver. Rotating the loop decreases the signal and the minimum is obtained when the loop is one hundred eighty degrees from maximum position. However, automatic compasses of the type utilized heretofore have not been reliable always with respect to fine accuracy and reliability, and in addition have required considerable apparatus to the end that a more accurate, reliable and lightweight apparatus is essential.

In the present invention two loops are utilized, the connections of first one loop and then the other being reversed by rotating the switch to provide four series of signal voltages to the receiver. These four interspersed series or signals are amplified and rectified separately by the receiver and further amplified by the voltage amplifier. A second rotating switch mechanically coupled to the first switch interrupts the output of the voltage amplifier and provides four separate D. C. potentials proportional to the four series of signal impulses applied to the receiver. Said four potentials are connected to stationary coils in the instrument as well as to condensers which retain the applied voltage to the coils in the same respect that a filter mechanism retains its charge in a half wave rectifier circuit.

Referring to the drawings wherein similar parts are indicated by identical reference numerals, the illustrated method described above includes vertical antenna A, a radio receiver C which may be of any known design, two sets D1 and D2 of rotary contacts, a voltage amplifier E and an indicating instrument which comprises an important aspect of the present invention and which will be described in detail hereinafter. The electrical connections of this system are clearly shown in Figure 1. The fixed loop antennae B1 and B2 are center tapped and are of a conventional design, loop B1 being mounted parallel to the fore and aft axis of the craft and loop B2 being fixed at ninety degrees to such axis, a rotating switch G1 reverses the connections of first loop B1 and then loop B2 as shown in Figure 1, providing four series of signal voltages to the receiver C. These four interspersed series of signals are amplified and rectified separately by the receiver and further amplified by the voltage amplifier E. The rotary switch G2 which is mechanically coupled to rotary switch G1 by shaft T, interrupts the output of the voltage amplifier and provides four separate D. C. potentials proportional to the four series of signal impulses applied to the receiver.

The four D. C. potentials are connected to the two stationary coils H1, H2 in the indicator as shown in Fig. 1, also to condensers K1, K2, K3 and K4 which retain the applied voltage to the coils in the same respect that a filter condenser retains its charge in a half wave rectifier circuit.

An essential element in the present invention is the instrument F which is a meter of the moving coil type and is similar to a dynamometer in construction. A moving coil L is wound on an aluminum frame L1 so as to rotate within two stationary coils H1 and H2, its movement being governed by magnetic energies only, no springs being used therein. Two pivots L3 and L4 are attached to the moving coil as is shown in Figure 3, and a pointer M is fixed to the top pivot L3 to extend at right angles to the moving coil L. Pivots L3 and L4 rotate freely in adjusting screws N, upper and lower, as shown in Fig. 4, such adjusting screws being similar to those used in many types of electrical indicating devices. Each adjusting screw is recessed with two communicating areas N1 and N2, N1 fixedly receiving a bored jewel O which offers a minimum of friction to the pivots. To establish positive electrical contact to the pivots, which are connected to the coil L, a small hole O1 is cut in the center of the jewel. Recess portion N2 beneath the jewel is a small well containing mercury P for maintaining electrical contact with a fine wire Q of platinum or other conductive material attached to the tip of the pivot as is shown in Fig. 4.

When the pivots are inserted in the adjusting screws, the platinum wire extends through the hole in the jewel into the mercury filled well. The pivot resting in the jewel cavity prevents the mercury from escaping. As the moving coil must rotate through three hundred sixty degrees, it is necessary to mount the top adjusting screw in the glass R on the top of the indicator. A fine wire R1 is connected to the adjusting screw and extended across the glass as shown in Fig. 5.

By reference to the wiring diagram of Fig. 1 a fixed potential is applied to the moving coil L and the resulting magnetic lines of force are always in the same direction and of the same intensity. The moving coil L is attracted to or repelled from stationary coils H1 and H2 depending upon the direction and amount of current flowing through them.

In the design of electrically responsive instruments such as radio direction receivers for vehicles such as air craft, considerable difficulty is characteristically encountered in their utilization due to the radio waves being absorbed or reradiated from objects adjacent the pick-up means. Known techniques exist for efficiently determining errors and it is an important aspect of the invention that such errors are readily compensated for. The instrument F includes a lightweight permanent magnet S which is attached to the top pivot of the instrument so that it rotates directly under the scale within the casing of the instrument. Cooperating with permanent magnet S are a plurality of small coils 25, 25 preferably ten in number, which are arranged around the inner periphery of the indicator so that they will attract or repel the permanent magnet in varying degrees, depending on the position of the coils in relation to the permanent magnet, each coil being adjustable to any position.

To maintain uniform response from the coils with varying attraction from the two stationary coils it is necessary to vary the current across the ten coils #25, according to the signal applied to the receiver. A variable resistor #26 is adjusted to zero potential across the coils with zero signal across the receiver input; as the signal increases, the D. C. potential from the rectified R. F., current increases the grid bias in the voltage amplifier tube, which, in turn decreases the plate current, therefore increasing the voltage across resistor #27 and coils #25.

The rotating contacts in switches G1 and G2 are driven by motor driven shaft T at approximately 3,600 R. P. M., each revolution creating four signal impulses to the receiver, and simultaneously four separate potentials to the ends of the two stationary coils in the indicator. Three non-magnet air-damping vanes V, V are fixed to pivot L3, and serve to balance magnet S.

In operation, assuming loop B1 is in line to the transmitter tuned by the receiver C, with loop B2 at right angles, switch G1 starting at contact #11 and rotating clockwise, the four signals applied to the receiver C will be as follows. #11, maximum, #12, minimum, #13 intermediate, #14 identical to #13. The four potentials are applied to the two stationary coils H1 and H2 in the indicator F as previously described, and will be of the following intensity, connection #4 maximum, #5 minimum, #6 intermediate, #7 identical to #6, as connection #4 has a higher potential above ground than connection #5, current will flow through coil H1, from connection #4 to #5, #4 being positive. As #6 and #7 have potentials of the same value above ground, no current will flow through coil H2.

The current flowing in the moving coil L creates a magnetic force, the north pole of which is attracted to the south pole created by coil H1, and the south pole of the moving coil L is attracted to the north pole of coil H1, rotating the moving coil L and pointer M, which indicates on the scale U the direction of the transmitter.

Rotating the craft and its two loops B1 and B2 ninety degrees clockwise, switch G1 will apply signal voltages to the receiver C in the following sequence: #11 intermediate, #12 identical to #11, #13 maximum, and #14 minimum. Therefore, an intermediate potential is applied to #4 and a like potential to #5, a maximum potential to #6 and a minimum to #7. Subsequently no current will flow through coil H1 and the current in coil H2 flows from #6 to #7, #6 being positive, rotating the moving coil L and pointer M ninety degrees.

Rotating the loops B1 and B2 clockwise another forty-five degrees, the four series of signals applied to the receiver C will be in the following sequence, #11 will be 25% greater than minimum and #12 will be 50% greater than #11, #13 will be identical to #11 and #14 will be identical to #12. The potentials to the ends of the stationary coils H1 and H2 will be as follows: connection #4, a value half way between the potentials applied to this contact in the two previously described loop positions. #5, the difference between the voltage applied to this connection when the loops were in the first and the second position. #6, the same as #4, and #7 the same as #5. Therefore the two stationary coils H1 and H2 in the indicator F have a like amount of current, and #5 and #6 are positive.

The resulting magnetic fields cause the moving coil L to rotate forty-five degrees clockwise, the magnetic field of the moving coil being half way between the magnetic fields of the two stationary coils H1 and H2. Any change in the position of the loops, rotates the moving coil L proportionately, the pointer M on the indicator F showing the number of degrees.

If it is desirable to eliminate the tone produced by the compass operation, switch V may be opened. This disconnects the loops B1 and B2 and provides normal aural reception from the receiver C.

The radio receiver C may be of conventional design as indicated in Figure 1 and preferably comprising a superheterodyne arrangement having a radio frequency tube 31, a combined oscillator and modulator tube 32, an intermediate frequency amplifying tube 33, a combined detector automatic volume control, an audio frequency amplifying tube 34 and a power amplifying tube 35. The construction and operation of a radio receiver of this kind being well known, it will not be necessary to describe it in detail save to explain that it connects with voltage amplifier E by conductors 37 and 43. The set includes headphones 38 for enabling the pilot to listen on the transmitting station. The receiver also includes potentiometer 39 by means of which the volume may be manually adjusted as desired.

From the foregoing it will be observed that the moving coil will always operate within the fixed coils of the instrument to insure that the pointer is always directed exactly toward the station. Since the instrument is constructed without springs it is at all times operative to rotate through three hundred sixty degrees in either direction depending upon the course of the craft with respect to the station. The electrical actuation of the instrument in the described system eliminates mechanical operations and enables a saving of weight of one-third in comparison with socalled automatic compasses.

The provision of the essential dynamometer type of design for the present instrument insures long life without deterioration of original efficiency and accuracy, since its direction indicating function can not deteriorate as in the case of any types utilizing permanent magnets instead of coil L.

The instrument casing has an internal circumferential groove 44 in which are slidable ten insulating rectangular frames 41, 41; ear 42 on each frame riding in guide slot 43.

The adjustable coils are preferably adjusted when the instrument is installed in the craft by manually shifting the coils in the frames up or down, or radially toward or away from the permanent magnet. Additional adjustment of said coils with respect to the permanent magnet is readily accomplished if desired by sliding the coil frames around the inner periphery of the instrument. Although ten such coils and frames are shown as preferable for convenient maximum correction, it will be understood that a greater or lesser number may be utilized where desired for satisfactory compensation. Any convenient testing method may be employed for detecting the various errors caused by the absorption or reflection of radio waves in the proximity of the pick-up means, and when same have been detected all of the errors may be individually eliminated readily by the universal mounting of the coils in the instrument. Once the compensating positions of the coils have been established the frames serve to retain them against accidental dislocation during the subsequent utilization of the instrument. If desired to compensate for error, any of the coils 25 may be turned around in its frame to reverse its polarity.

I claim:
1. In a directional radio receiver having directional pickup means for receiving signals from a distant transmitter, an electrical indicating instrument having an indicator pointer, means responsive to said signal for rotating said indicator pointer, a normally fixed, adjustable compensating coil in said instrument, means maintained in fixed position relative to the indicator pointer for creating a magnetic field, said adjustable coil being positionable in said instrument so as to react on said magnetic field for the purpose of retarding or accelerating the rotation of the indicator pointer to compensate for errors caused by absorption or reflection of radio waves in the proximity of said pick-up means, means for providing a D. C. potential directly proportional to the signal voltage picked up from said transmitter and connections from the latter means to said adjustable coil.

2. In a radio direction finding apparatus a vertical antenna, a radio receiver, a pair of directional loop antennae inductively coupled to the antenna and the input of the radio receiver, means for reversing the connections of first one loop antenna and then the other loop antenna to provide four series of signal voltages to the receiver, such reversing means including a rotatable switch to provide four separate D. C. potentials proportional to the series of signal impulses and an electrical indicating instrument including an indicator pointer and means responsive to said potentials for rotating said pointer, means fixed to the indicator pointer for creating a magnetic field, and normally fixed, adjustable compensating coil means positioned to react on said magnetic field to retard or accelerate the rotation of the pointer.

3. In a directional radio receiver, a dynamometer type of indicator instrument including two fixed coils disposed respectively at an exact ninety degree angle, a moving coil within said fixed coils and capable of rotation through three hundred sixty degrees an indicator pointer actuated by said moving coil, means fixed to the indicator pointer for creating a magnetic field, and normally fixed, adjustable compensating coil means positioned to react on said magnetic field to retard or accelerate the rotation of the pointer.

4. In a directional radio receiver, an electrical indicating instrument including means for creating a magnetic field capable of rotation through three hundred sixty degrees and having a fixed intensity and polarity, means for creating two fixed magnetic fields, one said field being disposed exactly ninety degrees with respect to the other, said fields being capable of varying in intensity and polarity, said first means rotating within said fixed means an indicator pointer actuated by said first means, means fixed to the indicator pointer for creating a magnetic field, and normally fixed, adjustable compensating coil means positioned to react on said magnetic field to retard or accelerate the rotation of the pointer.

5. In a directional radio receiver having pickup means, an electrical indicating instrument including an indicator pointer and having normally fixed, adjustable compensating coil means, means fixed to the indicator pointer for creating a magnetic field, said adjustable coil means being positioned to react on said magnetic field for the purpose of retarding or accelerating the rotation of the pointer to compensate for errors caused by absorption or reflection of radio waves in the proximity of the pick-up means.

6. In a directional radio receiver having pick-up means and an electrical indicating instrument having an indicator pointer, a normally fixed, adjustable compensating coil, and means maintained in fixed position relative to the indicator pointer for creating a magnetic field, said adjustable coil being positionable to react on said magnetic field for the purpose of retarding or accelerating the rotation of the indicator pointer to compensate for errors caused by absorption or reflection of radio waves in the proximity of said pick-up means.

7. In a radio direction finding apparatus a vertical antenna, a radio receiver, a pair of directional loop antennae inductively coupled to the antenna and the input of the radio receiver, means for reversing the connections of first one loop antenna and then the other loop antenna to provide four series of signal voltages to the receiver, such reversing means including a rotatable switch to provide four separate D. C. potentials proportional to the series of signal impulses, four capacitors alternately charged by the four separate D. C. potentials, two stationary coils in an indicator and connections from said coils to the four capacitors.

8. In a directional radio receiver having pick-up means, an electrical indicating instrument including an indicator pointer and having normally fixed, adjustable compensating coil means, means fixed to the indicator pointer for creating a magnetic field, said adjustable coil means being positioned to react on said magnetic field for the purpose of retarding or accelerating the rotation of the pointer to compensate for errors caused by absorption or reflection of radio waves in the proximity of the pick-up means, and a retaining element for said coil means movable around said pointer.

9. In a directional radio receiver having pick-up means and an electrical indicating instrument having an indicator pointer, a normally fixed, adjustable compensating coil, means maintained in fixed position relative to the indicator pointer for creating a magnetic field, a frame element frictionally engaging said coil and being movable in the instrument with respect to said pointer, said adjustable coil being movable in said frame upon manual adjustment for altering intensity or its polarity to react on said magnetic field for the purpose of retarding or accelerating the rotation of the indicator pointer to compensate for errors caused by absorption or reflection of radio waves in the proximity of said pick-up means.

10. In a directional radio receiver having pick-up means and an electrical indicating instrument having an indicator pointer, a plurality of normally fixed, adjustable compensating coils, and means maintained in fixed position relative to the indicator pointer for creating a magnetic field, said adjustable coils being positionable to react on said magnetic field for the purpose of retarding or accelerating the rotation of the indicator pointer to compensate for errors caused by absorption or reflection of radio waves in the proximity of said pick-up means.

11. In a directional radio receiver having pick-up means and an electrical indicating instrument having an indicator pointer, a plurality of adjustable coils, and means maintained in fixed position relative to the indicator pointer for creating a magnetic field, said adjustable coils being positionable radially, longitudinally and circumferentially with respect to said pointer so as to react on said magnetic field for the purpose of retarding or accelerating the rotation of the indicator pointer to compensate for errors caused by absorption or reflection of radio waves in the proximity of said pick-up means.

12. A directional indicating system including directional signal receiving means, an indicating instrument having an indicator pointer, means rotating said indicator pointer in response to the signals received by said directional receiving means, and means responsive to spurious components of the signals for counteracting the rotation of said indicator pointer in an amount corresponding to the relative strength of said spurious components.

JOHN R. STEINHOFF.